US006247201B1

(12) United States Patent
McCray

(10) Patent No.: US 6,247,201 B1
(45) Date of Patent: Jun. 19, 2001

(54) REAR WIPER BLADE PROTECTIVE DEVICE

(76) Inventor: Nora McCray, 1425 Kristan Ave., North Chicago, IL (US) 60064

( * ) Notice: Subject to any disclaimer, the term of this patent is extended or adjusted under 35 U.S.C. 154(b) by 0 days.

(21) Appl. No.: 09/489,990

(22) Filed: Jan. 21, 2000

(51) Int. Cl.⁷ ............................ B60S 1/00; B60J 1/20
(52) U.S. Cl. .................... 15/257.01; 15/250.19; 15/250.001; 248/505; 248/206.3
(58) Field of Search .................. 15/250.001, 246, 15/250.19, 250.16, 250.48, 257.01, 250.351, 250.352, 250.361; 248/250.5, 206.3, 505

(56) References Cited

U.S. PATENT DOCUMENTS

| 1,868,023 | * | 7/1932 | North | 248/205.5 |
| 3,174,536 | * | 3/1965 | Francis | 248/206.3 |
| 4,658,463 | | 4/1987 | Sugita et al. | 15/250.36 |
| 5,141,191 | * | 8/1992 | Loffield | 248/206.3 |
| 5,412,177 | | 5/1995 | Clark | 219/203 |
| 5,495,884 | * | 3/1996 | Shikler | 248/205.5 |
| 5,564,157 | | 10/1996 | Kushida et al. | 15/250.201 |

FOREIGN PATENT DOCUMENTS

| 588368 | * | 5/1977 | (CH) | 15/250.361 |
| 2147729 | * | 3/1973 | (DE) | 15/250.001 |
| 2617383 | * | 11/1977 | (DE) | 15/257.01 |
| 3334947 | * | 4/1985 | (DE) | 15/250.001 |

* cited by examiner

*Primary Examiner*—Gary K. Graham
(74) *Attorney, Agent, or Firm*—Goldstein Law Offices P.C.

(57) ABSTRACT

A rear wiper blade protective device including a cylindrical tube having an open first end and a closed second end. The open first end is dimensioned for receiving the rear wiper blade therein. A pair of suction cups are coupled with respect the cylindrical tube whereby the suction cups can be adhered to the rear windshield with the rear wiper blade positioned within the cylindrical tube.

1 Claim, 2 Drawing Sheets

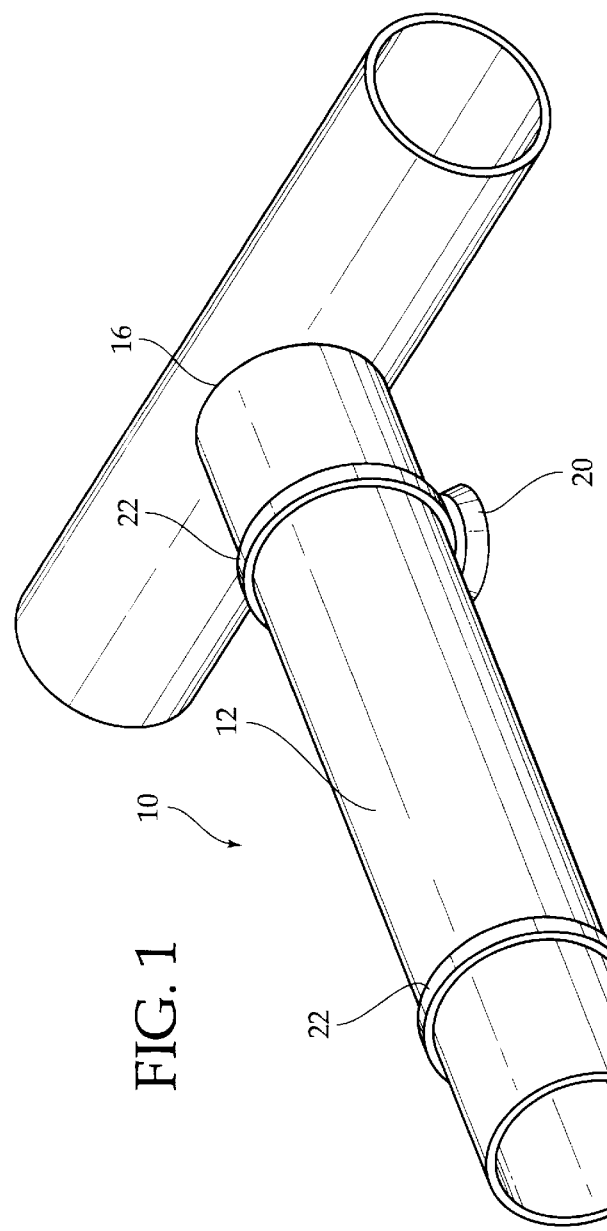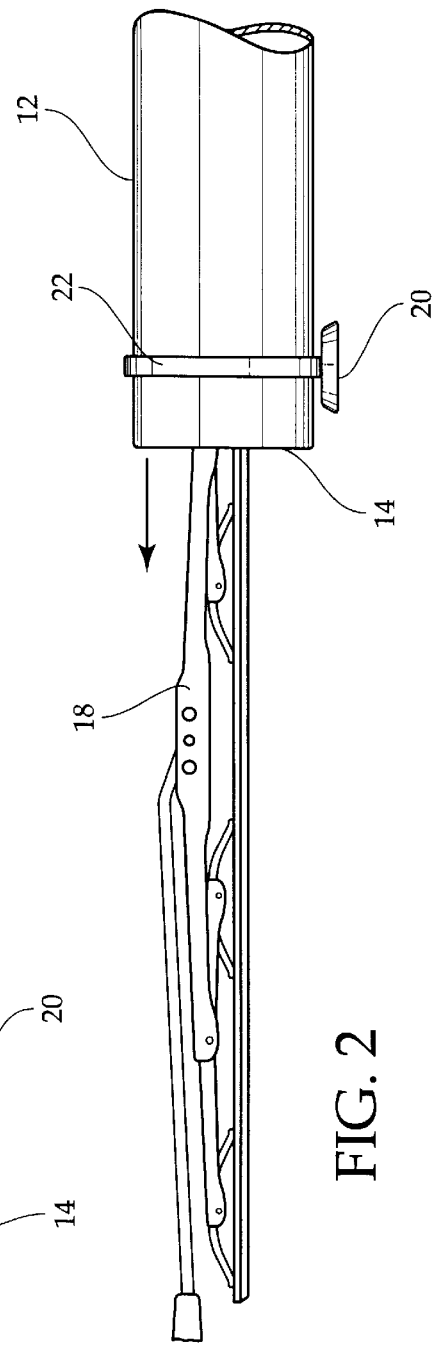

REAR WIPER BLADE PROTECTIVE DEVICE

BACKGROUND OF THE INVENTION

The present invention relates to a rear wiper blade protective device and more particularly pertains to protecting a rear wiper blade of a vehicle while the vehicle goes through an automatic car wash.

The use of wiper blade accessories and assemblies is known in the prior art. More specifically, wiper blade accessories and assemblies heretofore devised and utilized for the purpose of improving the operation of a wiper blade are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,412,177 to Clark discloses an electrically heated cover for a wiper blade to prevent ice from forming on a windshield wiper blade during cold weather. U.S. Pat. No. 5,564,157 to Kushida discloses a vehicle wiper assembly with a cover for supporting the blade for use in cold weather. U.S. Pat. No. 4,658,463 to Sugita discloses a wiper blade assembly.

While these devices fulfill their respective, particular objective and requirements, the aforementioned patents do not describe a rear wiper blade protective device for protecting a rear wiper blade of a vehicle while the vehicle goes through an automatic car wash.

In this respect, the rear wiper blade protective device according to the present invention substantially departs from the conventional concepts and designs of the prior art, and in doing so provides an apparatus primarily developed for the purpose of protecting a rear wiper blade of a vehicle while the vehicle goes through an automatic car wash.

Therefore, it can be appreciated that there exists a continuing need for a new and improved rear wiper blade protective device which can be used for protecting a rear wiper blade of a vehicle while the vehicle goes through an automatic car wash. In this regard, the present invention substantially fulfills this need.

SUMMARY OF THE INVENTION

In the view of the foregoing disadvantages inherent in the known types of wiper blade accessories and assemblies now present in the prior art, the present invention provides an improved rear wiper blade protective device. As such, the general purpose of the present invention, which will be described subsequently in greater detail, is to provide a new and improved rear wiper blade protective device which has all the advantages of the prior art and none of the disadvantages.

To attain this, the present invention essentially comprises a vehicle having a rear windshield. The rear windshield has a wiper coupled therewith. A cylindrical tube is provided having an open first end and a closed second end. The open first end receives the wiper therein. A pair of suction cups are secured to the cylindrical tube. Each of the suction cups have an upper end with a band secured thereto. The band is wrapped around the cylindrical tube whereby the suction cups can be adhered to the rear windshield.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rear wiper blade protective device which has all the advantages of the prior art wiper blade accessories and assemblies and none of the disadvantages.

It is another object of the present invention to provide a new and improved rear wiper blade protective device which may be easily and efficiently manufactured and marketed.

It is a further object of the present invention to provide a new and improved rear wiper blade protective device which is of durable and reliable construction.

An even further object of the present invention is to provide a new and improved rear wiper blade protective device which is susceptible of a low cost of manufacture with regard to both materials and labor, and which accordingly is then susceptible of low prices of sale to the consuming public, thereby, making such a rear wiper blade protective device economically available to the buying public.

Even still another object of the present invention is provide a new and improved rear wiper blade protective device for protecting a rear wiper blade of a vehicle while the vehicle goes through an automatic car wash.

Lastly, it is an object of the present invention to provide a new and improved rear wiper blade protective device including a cylindrical tube having an open first end and a close second end. The open first end is dimensioned for receiving the rear wiper blade therein. A pair of suction cups are coupled with respect to the cylindrical tube whereby the suction cups can be adhered to the rear windshield with the rear wiper blade positioned within the cylindrical tube.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the rear wiper blade protective device constructed in accordance with the principles of the present invention.

FIG. 2 is a side view of the present invention illustrated receiving a wiper blade therein.

The same reference numerals refer to the same parts through the various figures.

DESCRIPTION OF THE PREFERRED EMBODIMENT

Figure 3:
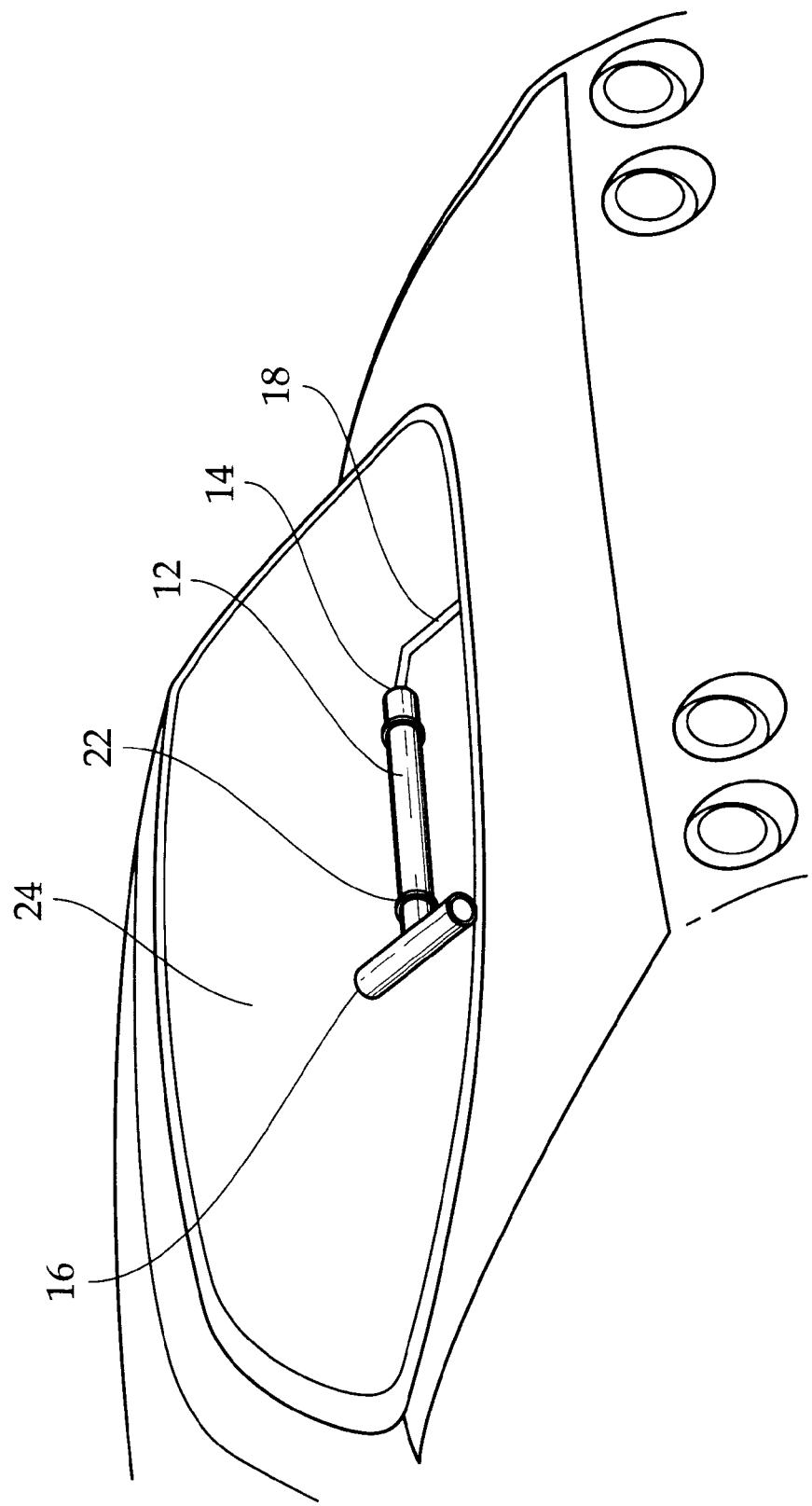
FIG. 3 is a perspective view of the present invention illustrated in use.

With reference now to the drawings, and in particular, to FIGS. 1 through 3 thereof, the preferred embodiment of the new and improved rear wiper blade protective device embodying the principles and concepts of the present invention and generally designated by the reference number 10 will be described.

Specifically, it will be noted in the various Figures that the device relates to a rear wiper blade protective device for protecting a rear wiper blade of a vehicle while the vehicle goes through an automatic car wash. In its broadest context, the device consists of a cylindrical tube and a pair of suction cups Such components are individually configured and correlated with respect to each other so as to attain the desired objective.

The cylindrical tube 12 has an open first end 14 and a closed second end 16. Note FIG. 1. The open first end 14 receives the rear wiper blade 18 therein. Note FIG. 2. The cylindrical tube 12 should be constructed having a length greater than a length of the rear wiper blade 18 so that the rear wiper blade 18 can be positioned completely within the cylindrical tube 12.

The pair of suction cups 20 are secured to the cylindrical tube 12. Preferably, one suction cup is positioned adjacent to the open first end 14 and the other suction cup is positioned adjacent to the closed second end 16. Each of the suction cups 20 have an upper end with a band 22 secured thereto. The band 22 is wrapped around the cylindrical tube 12 whereby the suction cups 20 can be adhered to the rear windshield 24. Note FIG. 3.

In use, the suction cups 20 are dampened and the rear wiper blade 18 is positioned within the cylindrical tube 12. Next, the dampened suction cups 20 are pressed against the rear windshield 24 to achieve securement. The vehicle is now ready to proceed through an automatic car wash without risk of damaging the rear wiper blade 18.

As to the manner of usage and operation of the present invention, the same should be apparent from the above description Accordingly, no further discussion relating to the manner of usage and operation will be provided.

With respect to the above description then, it is to be realized that the optimum dimensional relationships for the part of the invention, to include variations in size, materials, shape form, function and the manner of operation, assembly and use, are deemed readily apparent and obvious to one skilled in the art, and all equivalent relationships to those illustrated in the drawing and described in the specification are intended to be encompasses by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A rear wiper blade protective device for protecting a rear wiper blade of a vehicle while the vehicle goes through an automatic car wash comprising, in combination:

a vehicle having a rear windshield, the rear windshield having a wiper coupled therewith;

a cylindrical tube having an open first end and a closed second end, the open first end receiving the wiper therein;

a pair of suction cups secured to the cylindrical tube each of the suction cups having an upper end with a band secured thereto, the band being wrapped around the cylindrical tube whereby the suction cups can be adhered to the rear windshield.

* * * * *